United States Patent [19]

Happel

[11] 4,284,043
[45] Aug. 18, 1981

[54] METHOD FOR OPERATING AN AIR-COMPRESSING AUTO-IGNITING INTERNAL COMBUSTION ENGINE AND INJECTION VALVE SUITABLE THEREFOR

[75] Inventor: Robert Happel, Waiblingen, Fed. Rep. of Germany

[73] Assignee: Daimler-Benz Aktiengesellschaft, Stuttgart, Fed. Rep. of Germany

[21] Appl. No.: 964,172

[22] Filed: Nov. 28, 1978

[30] Foreign Application Priority Data

Dec. 3, 1977 [DE] Fed. Rep. of Germany ....... 2753953

[51] Int. Cl.³ ............................................ F02M 45/08
[52] U.S. Cl. .................................. 123/299; 123/305; 123/557; 239/135; 239/533.2; 239/574; 239/409; 239/410
[58] Field of Search ............... 123/32 G, 32 JV, 32 J, 123/32 AH, 32 R, 30 B; 239/135, 533.2, 533.3, 533.4, 533.5, 533.7, 533.8, 533.9, 533.11, 574, 409, 410

[56] References Cited

U.S. PATENT DOCUMENTS

| | | | |
|---|---|---|---|
| 2,243,011 | 5/1941 | L'Orange | 239/533.8 |
| 2,435,213 | 2/1948 | Hancock | 123/32 AH |
| 2,858,811 | 11/1958 | Bede | 123/32 J |
| 3,391,871 | 7/1968 | Fleischer et al. | 123/32 G |
| 4,022,165 | 5/1977 | Eckert et al. | 123/32 G |
| 4,176,628 | 12/1979 | Kanai et al. | 123/32 A |
| 4,187,825 | 2/1980 | Loyd, Jr. | 239/453 |

FOREIGN PATENT DOCUMENTS

| | | | |
|---|---|---|---|
| 1284687 | 12/1968 | Fed. Rep. of Germany | 123/32 G |
| 682496 | 11/1952 | United Kingdom | 123/32 AH |

*Primary Examiner*—Ronald H. Lazarus
*Assistant Examiner*—Andrew M. Dolinar
*Attorney, Agent, or Firm*—Craig and Antonelli

[57] ABSTRACT

A method and apparatus for operating an air-compressing internal combustion engine with auto-ignition in which the fuel quantity to be injected is supplied initially in at least one pre-injection jet and thereafter in at least one main injection jet; the fuel of the main injection is preheated to a temperature above the temperature range critical for an evaporation of the fuel at least during operation of the engine in its upper load range while the fuel of the pre-injection is kept below the critical temperature; the injection valve includes two pressure spaces which are series-connected, whereby the pressure space disposed in second place, as viewed in the direction of flow, is arranged in heat-absorbing relationship to the interior of the working space of the internal combustion engine.

21 Claims, 7 Drawing Figures

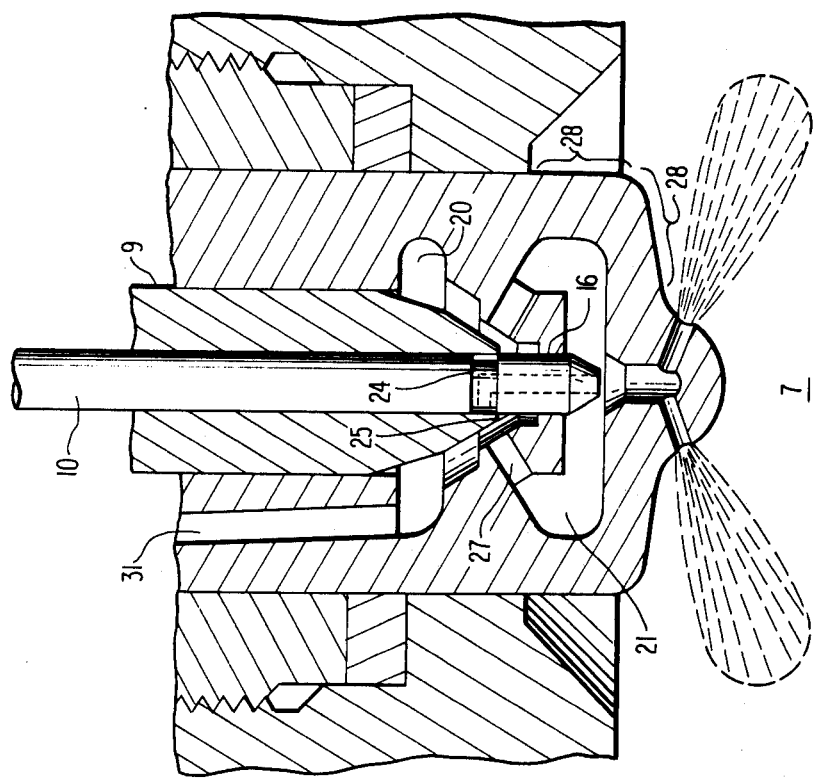
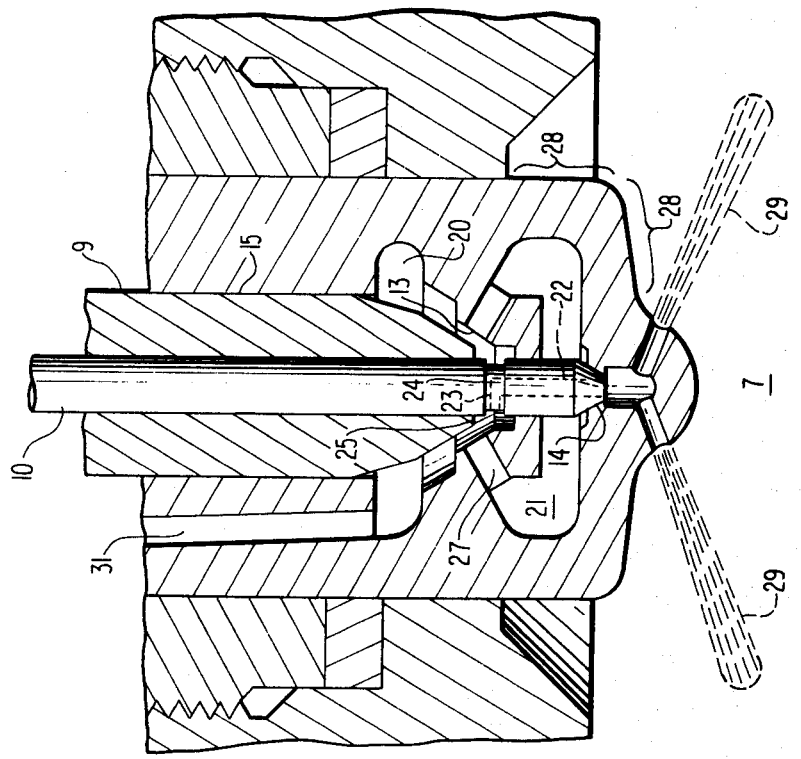

METHOD FOR OPERATING AN AIR-COMPRESSING AUTO-IGNITING INTERNAL COMBUSTION ENGINE AND INJECTION VALVE SUITABLE THEREFOR

The present invention relates to a method for the operation of an air-compressing, auto-igniting internal combustion engine and to an injection valve suitable for such method.

A double needle valve with concentrically nested valve needles or pins and with two separate pressure spaces which pass over into a common injection opening is disclosed in the German Pat. No. 1,284,687. It is additionally known to impart a definite turbulence to the compressing combustion air prior to or during the compression stroke. The relatively orderly turbulent flow inside of the working space has the task to assure an improved distribution of the fuel droplets inside of the working space. One aims by the pre-injection initially only of a pilot jet that a small fuel quantity is initially brought to ignition and that, after this pre-injection quantity has been ignited and after the compression end temperature has been raised by the explosion, and the combustion has been initiated, the subsequently injected main fuel quantity immediately ignites and combusts in the course of its injection without great ignition delay, as a result of which an altogether soft combustion progress is to be realized by reason of the aimed-at successive combustion of the injected fuel. However, especially at higher rotational speeds and with larger injection quantities, this success is attainable only in part. Before a liquid fuel can combust, it must initially evaporate. The evaporation velocity of the fuel, however, is smaller than the combustion velocity of the evaporated fuel. The combustion velocity is therefore determined by the possibility and by the velocity of the fuel evaporation. Especially with large injection quantities and/or at high engine rotational speeds, an orderly evaporation is overtaken by the beginning expansion and by the cooling-off of the working gas conditioned therewith so that it will lead to a discontinuation of the evaporation at least of the less volatile components of the fuel, i.e., those with high boiling point. The latter combust only incompletely and a large soot proportion will result in the exhaust gases of the internal combustion engine. Though they are not directly poisonous, they represent nonetheless a carcinogen in case of interaction over long periods of time.

It is the aim of the present invention to indicate a method for the operation of an internal combustion engine of the type described above as well as a suitable injection valve, which permit a higher combustion velocity and a slight ignition delay so that a complete combustion which is as free of soot as possible and which proceeds softly and without delay corresponding to the fuel injection, is attainable also with high injection quantities and/or at high engine rotational speeds by means of a stepwise injection.

The underlying problems are solved according to the present invention as regards the method for operating the air-compressing internal combustion engine with auto-ignition in that at least during the operation of the internal combustion engine in its upper load range, the fuel exclusively of the main injection is heated beforehand to a temperature lying above the critical temperature range for an evaporation of the fuel and in that the fuel of the pre-injection is kept below the critical temperature. From an apparatus point of view, underlying problems are solved according to the present invention in that the injection valve includes two pressure spaces hydraulically series-connected and in that the pressure space which is located in the second place, as viewed in the flow direction, and which is adapted to be closed off on both sides by valve needles, is arranged exposed in a heat-absorbing relationship to the interior of the working space of the internal combustion engine while the volume of this second pressure space is selected approximately as large as the largest fuel quantity to be injected during operation per working cycle by way of the injection valve.

By reason of the cyclic preheating of the injection quantity for the next working cycle to about 300° C.–480° C., it is achieved that the fuel which is still liquid and under high pressure during the warm-up phase, passes over without delay into the vapor phase during the injection into the working space, in which a lower pressure prevails, as a result of which a very rapid combustion becomes possible. By reason of the evaporation and by reason of the turbulence in the working space, also a good coordination of air oxygen and fuel is achieved so that a rapid and complete combustion is realized also at high operating velocities. Owing to the immediate evaporation of the fuel during the injection into the working space, a high diffusion velocity between air and fuel is achieved up to into the jet core area. The injected fuel breaks up by reason of the evaporation in the manner of a saturated vapor jet exiting into the atmosphere, as a result of which an enlarged surface of the injection jet is realized. In conjunction with the turbulence, a better and more rapid inner mixture formation is achieved thereby, which proceeds approximately proportionally with the combustion velocity. Since the fuel is injected into the working space quasi in evaporated, respectively, evaporating form and the fuel jet which breaks up in this manner does not have as large a range in the strongly compressed air, only very slight fuel accumulations will occur at the combustion space walls; this also enhances a perfect and complete combustion of the injected fuel since the fuel particles adhering to the relatively cold combustion space walls combust less rapidly and incompletely. Owing to the better mixture formation on the side of the fuel, the expenditure for producing an air swirl inside of the working space need not be pushed as high. In addition to the already mentioned advantage of a more rapid as well as of a softer combustion and of the lowering of the combustion noises connected therewith and in addition to the advantage of a complete and far-reachingly soot-free combustion, the further advantage of a better exhaust gas composition will be realized, i.e., fewer cracked products are contained in the exhaust gases and the odor annoyance by the exhaust gases is also smaller. By reason of the better fuel utilization, also a higher efficiency and economy as well as a greater engine output are achieved.

Accordingly, it is an object of the present invention to provide a method and apparatus for operating an air-compressing internal combustion engine with auto-ignition, which avoids by simple means the aforementioned shortcomings and drawbacks encountered in the prior art.

Another object of the present invention resides in the method and apparatus for the operation of an air-compressing auto-igniting internal combustion engine, which produces an altogether softer and more complete combustion process at all rotational speeds and even with larger injection quantities.

Still another object of the present invention resides in a method and apparatus for operating an air-compressing internal combustion engine with auto-ignition, which assures a complete combustion with relatively low soot proportion in the exhaust gases.

A further object of the present invention resides in a method and apparatus for operating an air-compressing auto-igniting internal combustion engine which enables higher combustion velocities and lesser ignition delays to improve the combustion process.

A still further object of the present invention resides in a method and apparatus for operating an air-compressing auto-igniting internal combustion engine, in which the liquid fuel during the injection into the operating space passes over without delay into the vapor phase to enhance a rapid combustion also at high operating velocities.

Still another object of the present invention resides in a method and apparatus for operating an air-compressing internal combustion engine with auto-ignition, in which a high diffusion velocity between air and fuel is attained up to into the jet core area to provide better and improved mixture formation.

Another object of the present invention resides in a method and apparatus for operating an auto-igniting air-compressing internal combustion engine of the type described above, which assures improved exhaust gas quality as well as higher efficiency and engine output.

These and other objects, features and advantages of the present invention will become more apparent from the following description when taken in connection with the accompanying drawing which shows, for purposes of illustration only, several embodiments in accordance with the present invention, wherein:

FIGS. 3 and 4 are partial cross-sectional views through the lower part of the injection valve of FIG. 2, on the one hand during the injection of the pilot jet (FIG. 3) and on the other during the main injection (FIG. 4);

Figure 1:
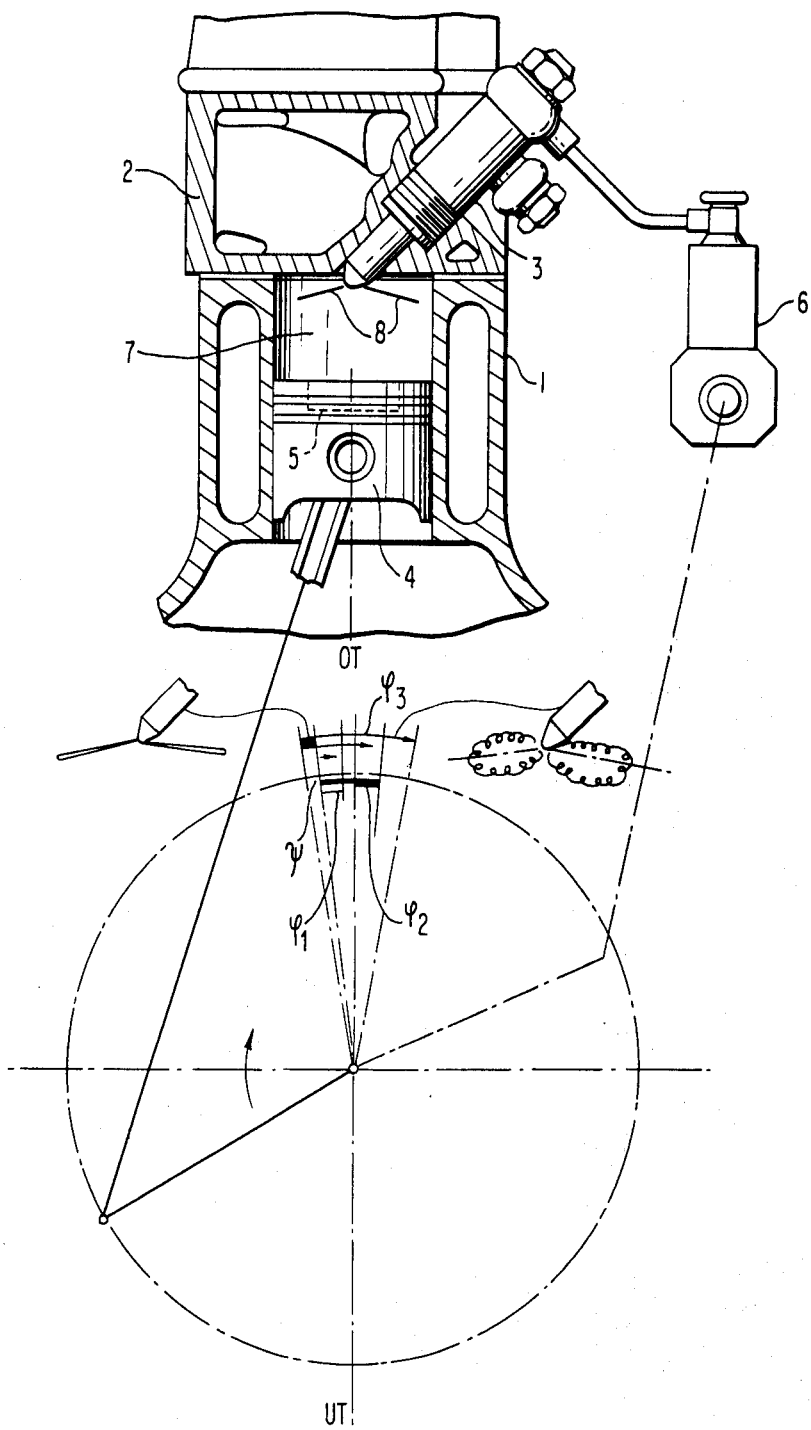
FIG. 1 is a schematic partial view, partly in cross section, of an air-compressing internal combustion engine with an injection valve according to the present invention.

Referring now to the drawing wherein like reference numerals are used throughout the various views to designate like parts, the internal combustion engine illustrated in FIG. 1 consists essentially of an engine block 1, of a cylinder head 2 with an injection valve 3 arranged therein as well as of a reciprocating piston 4 having a piston recess 5. The injection valve 3 is so arranged that it injects directly into the working space 7 (jet axes 8). An injection pump 6 additionally forms part of the internal combustion engine, which is driven from the crankshaft indicated schematically and on an enlarged scale at half the crankshaft rotational speed. The injection valve shown in FIG. 2, which, though illustrated only in part, shows in detail the essential elements thereof, includes two concentrically nested valve needles or pins 9 and 10 which are each pressed by a separate closing spring 11 and 12 against the associated valve seat 13 and 14, respectively. The needle stems represent small valve needle pistons 15 and 16, which are larger in diameter than the associated valve seat; an annularly shaped effective piston surface results therefrom. The inner valve needle or pin 10 projects with its outer end 26 sealingly through the outer end 25 of the outer valve needle 9. Above the valve seat, a ring-shaped pressure chamber 20, respectively, 21 is arranged about the corresponding valve needle. The fuel to be injected is supplied to the injection valve, respectively, to the upper first pressure chamber 20 from the injection pump 6 through the bore or pressure line 31. The outer valve needle 9 can be lifted off from its valve seat 13 in the upward direction by the pressure in the chamber 20 opposite the pressure of the closing spring 11 and opposite the through-flow direction 17. In a similar manner, the inwardly disposed valve needle 10 can be lifted off from its valve seat 14 opposite the associated closing spring 12. In each case, the fuel flowing through the valve seats, respectively, through the valve needle can reach the apertured nozzles 18 which are common to both pressure spaces 20 and 21.

The two pressure spaces (upstream pressure space 20) and (downstream pressure space 21) are series-connected from a hydraulic functional point of view and are traversed sequentially by the fuel to be injected. In the embodiment according to FIGS. 2 to 4, the two pressure spaces 20 and 21 are in communication by a ring of bores 27 which terminate inside of the upper valve needle seat 13. A leakage-free closure of the lower pressure chamber 21 in the upward direction is assured thereby by the outer valve needle 9. In the downward direction, the second pressure chamber 21 is closed off securely and leakage-free by the inner valve needle 10. The outer end 26 of the inner valve needle 10 is bored hollow in the longitudinal and cross direction—bores 22 and 23—, whereby the cross-bore 23 terminates in an annular groove 24. This annular groove 24 is adapted to be valved by the control edge 25 of the outer valve needle 9 in the manner of a piston slide valve member. The second pressure chamber 21 is arranged exposed to the interior of the working space 7; the cylinder head is machined free (ring-shaped recess 40) within the area of the lower end of the injection valve. Heat-absorbing or heat-inlet surfaces 28 result therefrom within the area of the second pressure chamber 21, which favor a heat-transfer from the interior of the working space 7 through the exposed walls to the fuel disposed in the pressure space 21. The volume of this pressure space 21 adapted to be closed off securely and leakage-free in the upward and downward direction, is selected nearly as large as the full-load injection quantity (approximately 80% to about 90% thereof). The first pressure chamber 20 which is disposed further inwardly in the injection valve body, is less strongly exposed to a heat inlet or heat admission by reason of the set-back arrangement and by reason of the fuel flowing cyclically therethrough so that the fuel disposed therein heats up less strongly. The wall thickness within the area of the heat inlet or heat admission surfaces 28 is so selected and designed that the fuel enclosed by the second pressure chamber 21 is heated therein to about 300° C. to about 480° C. during a working cycle.

Centering rings, respectively, centering plates for the closing springs are arranged at the upper end of the two valve needles 9 and 10. The lower centering ring includes a ring-shaped extension 34 which serves as abutment ring for the upper centering plate 33 of the inner valve needle 10. The axial extent of the abutment ring 34 is so selected that a predetermined maximum dimension H results for the relative stroke of the outer valve needle 9 with respect to the inner valve needle 10. This dimension H is so selected that the annular groove 24 is laid open or freed with certainty.

Figure 2:
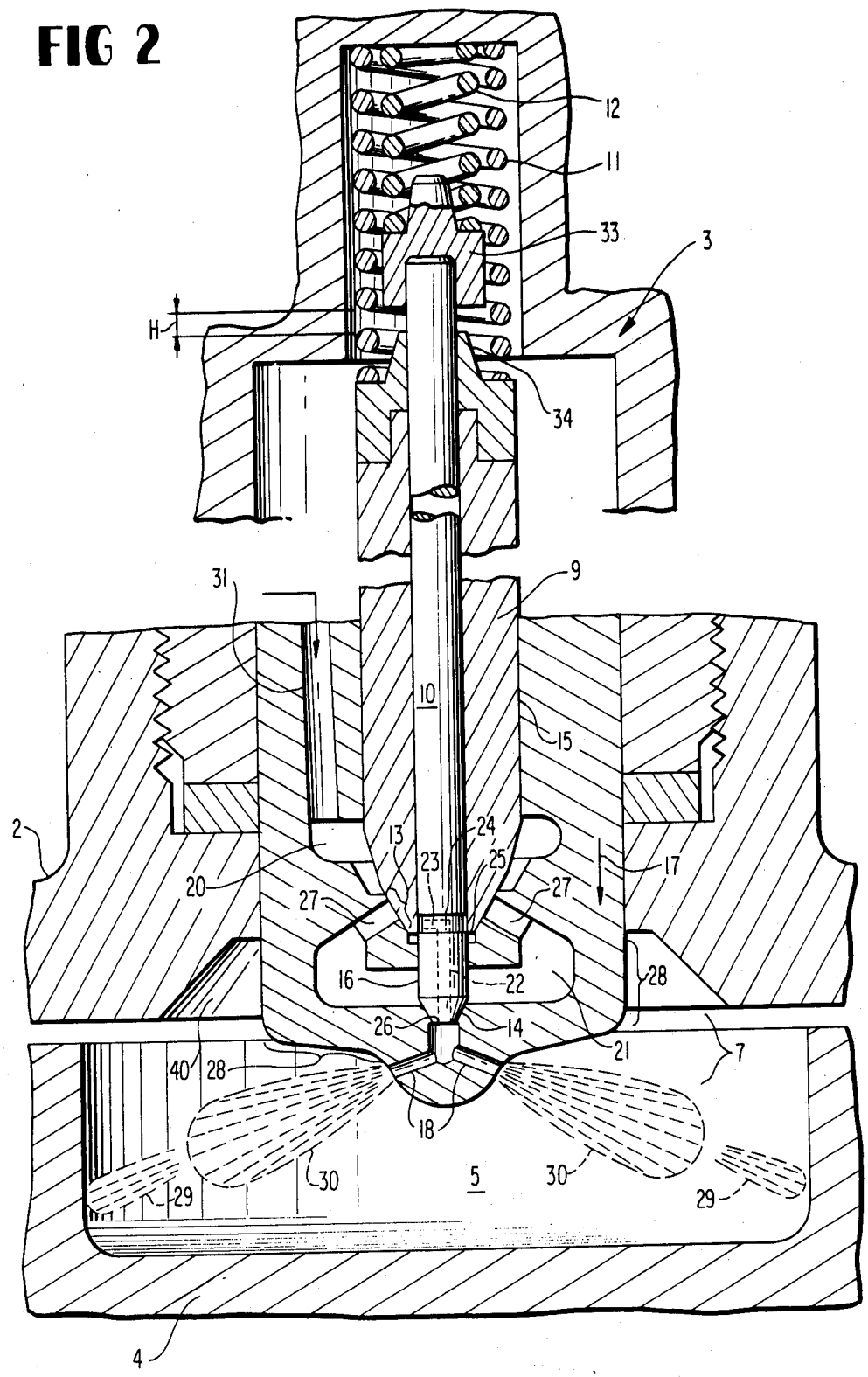
FIG. 2 is a partial cross-sectional view, on an enlarged scale, through one embodiment of an injection valve according to the present invention.
Figure 7:
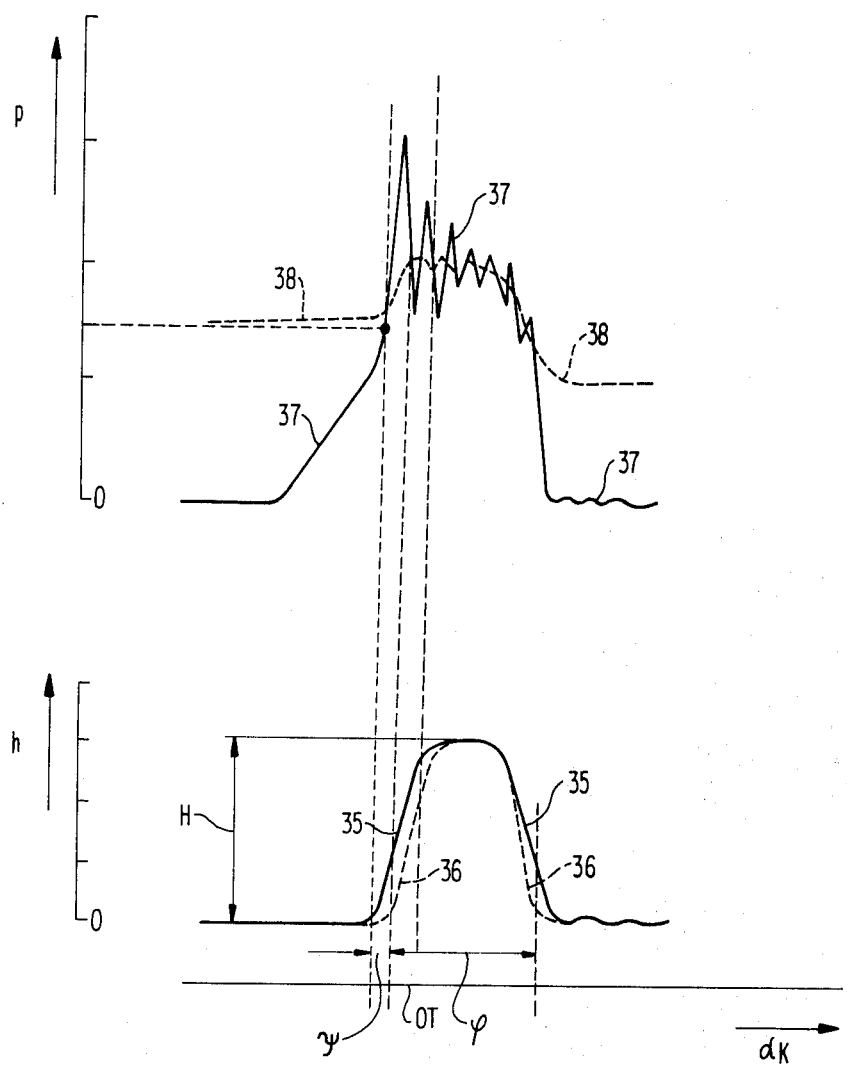
FIG. 7 are diagrams illustrating the curves of the pressure in the pressure chambers of the two valve needles and the needle stroke of the two valve needles plotted as a function of crankshaft angle.

The operation of the valve according to FIGS. 2 to 4 is now briefly as follows, whereby reference is also made to the circular crankshaft diagram in FIG. 1 and to the stroke and pressure curves in FIG. 7: Toward the end of the compression stroke of the piston 4, the injection pump 6 commences to feed, whence fuel is forced into the first pressure chamber 20 by way of the bore or pressure line 31. As a result thereof, the initially relieved pressure increases in this space—compare the rising flank of the pressure curve 37 in FIG. 7. With an increasing pressure in the chamber 20, a condition will be reached at some point in which the force acting on the annularly shaped effective end face of the outer valve needle 9 is able to overcome the force of the closing spring 11. The pressure, beginning with which a valve needle lifts off from its seat, will be referred to herein as opening pressure. The opening pressure for the inner valve needle 10 is selected higher than the opening pressure for the valve needle 9. Consequently, the inner valve needle 10 remains initially closed during the beginning needle stroke of the outer valve needle 9. As a result of the lifting-off of the outer valve needle 9, however, the annular groove 24 and together with the same, the bores 23 and 22 are exposed or laid open so that with a still closed inner valve needle 10, fuel can be injected through the inner valve needle 10 past the lower valve seat 14 by way of the hole-type nozzles 18. This fuel is relatively cold by reason of the low temperature level of the valve body within the area of the upper first pressure chamber 20. The fuel is injected during this pre-injection phase $\Psi$ into the working space 7, in a strongly bundled jet of great range, whereby the working space 7 is formed essentially exclusively by the piston recess 5. The strong beaming or concentrating of the jet and the great range can be traced back essentially to the low fuel temperature of the pilot jet.

The beaming and the large range of the pilot jet is quite intentional because a good distribution of the pre-injection quantity can be achieved thereby in the compression end space. The turbulence in the working space toward the end of the compression stroke assures as to the rest a good distribution of the fuel droplets injected by means of the pilot jet into the combustion space. Insofar as an orderly swirl in the inflowing air is not already caused in the working space during the suction stroke, a turbulent flow can also be caused by the squeeze edges which are formed at the piston top by reason of the piston recess. The pilot jet initiates within the combustion space the combustion progress with moderate pressure and temperature rise. Any wall wettings by the fuel at the wall of the piston recess 5 are relatively rapidly evaporated by reason of the high temperature level of these walls and will also combust completely because sufficient time still remains and favorable conditions exist for the evaporation and combustion—high pressure and high temperature. The pilot jet 29 (FIGS. 2 and 3) is injected within an annular space $\Psi$ that remains approximately constant independently of the load, still prior to the passage of the piston through its upper dead-center position. The condition of the injection valve during this pre-injection is illustrated in FIG. 3.

Following the pre-injection directly from a time point of view, the opening pressure for the inner valve needle 10 will also be reached at some point in the second pressure space 21 by reason of the continuing feed of the injection pump 6 so that also this valve needle 10 will lift off from its seat 14. As will be explained more fully hereinafter, the fuel in the pre-heat chamber 21 which is adapted to be closed off leakage-free by the valve needles, is under a higher pressure also between the injection phases, which is indicated by the higher level of the pressure curve 38 shown in dash line in FIG. 7. After a pressure increase is also noticeable in the pre-heat chamber 21—based on this increased pressure level—, the inner valve needle 10 begins to lift off which is indicated in the lower diagram in FIG. 7 by the dash stroke-curve 36. By reason of the opening of the valve seat 14, the fuel enclosed in the pre-heat chamber 21 can enter the combustion space by way of the hole-type nozzles 18. The pressure prevailing in the combustion space is lower than the injection pressure. The fuel preheated to critical temperature values thus expands upon entry into the combustion space and as a result thereof, evaporates without delay. It thereby involves an expansion evaporation which can take place in the shortest time intervals and up to into the jet core because no heat transfer is necessary therefor. The evaporating fuel injected into the combustion space can ignite without delay in proportion to its injection and can combust rapidly. The combustion rule can therefore be predetermined by the injection rule thanks to the extremely slight ignition delay. A soft and noise-free combustion is attainable thereby. The fuel evaporating during the injection, by reason of its sudden evaporation and jet expansion, has only a slight range and therefore does not wet the walls of the combustion space. By reason of the turbulence and the large jet expansion, a good interior mixture formation is achieved.

The condition of the injection valve during the main injection phase is illustrated in FIG. 4. By reason of the needle stroke of the inner valve needle 10, the annular groove 24 is closed off by the end face 25 of the outer valve needle 9 and together with the same the pre-injection channel is closed off by the inner valve needle 10. The fuel to be injected now reaches from the first pressure chamber 20 by way of the overflow bores 27 into the preheat chamber 21. The preheated fuel is displaced from the preheat chamber 21 into the combustion space and not preheated follow-up fuel flows into the preheat chamber 21. The chamber volume of the preheat chamber 21 is thereby selected to approximately 80% to 90% of the full-load injection quantity so that at full load the entire main injection quantity consisting of preheated fuel can be displaced out of the preheat chamber 21. The fuel quantity injected with the vaporating main injection jet 30 is controlled dependent on load; the injection time extends depending on load condition, respectively, load control in the internal combustion engine over different crankshaft angles $\phi_1$, $\phi_2$, $\phi_3$ in the crankshaft diagram according to FIG. 1. With the regulation of higher load conditions, the main injection can extend beyond the upper dead-center position OT.

Toward the end of the feed of the injection pump 6, the pressure drops off in the pressure spaces 20 and 21 by reason of the discharge or outflow of further fuel out of these pressure spaces. By reason of the higher opening pressure of the inner valve needle 10, initially the inner valve needle 10 will be lowered onto its seat 14. This closing of the inner valve needle 10 which takes place at first, is indicated in the curve diagram h of the stroke curve 36 for the inner valve needle by the steeper drop from the maximum stroke H. During a further discharge of fuel out of the preheat chamber 21, the pressure therein also drops below the opening pressure for the outer valve needle 9 so that also this valve needle will be lowered onto its valve seat 13 and thereby closes off the overflow bores 27 leakage-free. The pressure level in the preheat chamber 21 after the termination of the main injection is indicated by a higher level of the pressure curve 38 shown in dash line in FIG. 7. The pressure in the first pressure chamber 20 drops down to the pump inlet pressure of the injection pump which is illustrated by the steep drop and the low level of the pressure curve 37 for the chamber 20, shown in full lines. The preheat chamber 21 is closed off leakage-free in both directions by the valve needles and the fuel supply enclosed therein is at a pressure corresponding to the opening pressure of the outer valve needle. Owing to the high pressure level of the enclosed fuel, the latter can be heated to over-critical values during the operating cycle and during the following charge exchange without beginning to evaporate; it exists in liquid phase at the increased pressure. The heat input into the preheat chamber 21 will adjust itself automatically according to the load condition of the engine. At a high load and high fuel through-put, a high thermal energy is freed or released in the combustion space, which leads to a correspondingly strong heat flow in the direction toward the thermally exposed preheat chamber 21. Under lesser load conditions, in which by reason of a sufficiently large air excess, the danger of incomplete combustions and soot formation is less, a lesser warm-up of the fuel enclosed in the preheat chamber will establish itself automatically because the released thermal energies and the heat flow acting on the preheat chamber are smaller. However, at least also within the range of middle and higher partial loads, it will lead to a noticeable temperature increase of the fuel quantity enclosed in the preheat chamber 21, which is effective in the sense of the present invention. In that connection, it should be taken into consideration above all that with smaller main injection quantities, the average duration of the fuel to be injected within the preheat chamber extends proportionately over more than one complete working cycle of the internal combustion engine and a deficit of temperature drop is correspondingly compensated by reason of the larger time influence.

Figure 5:
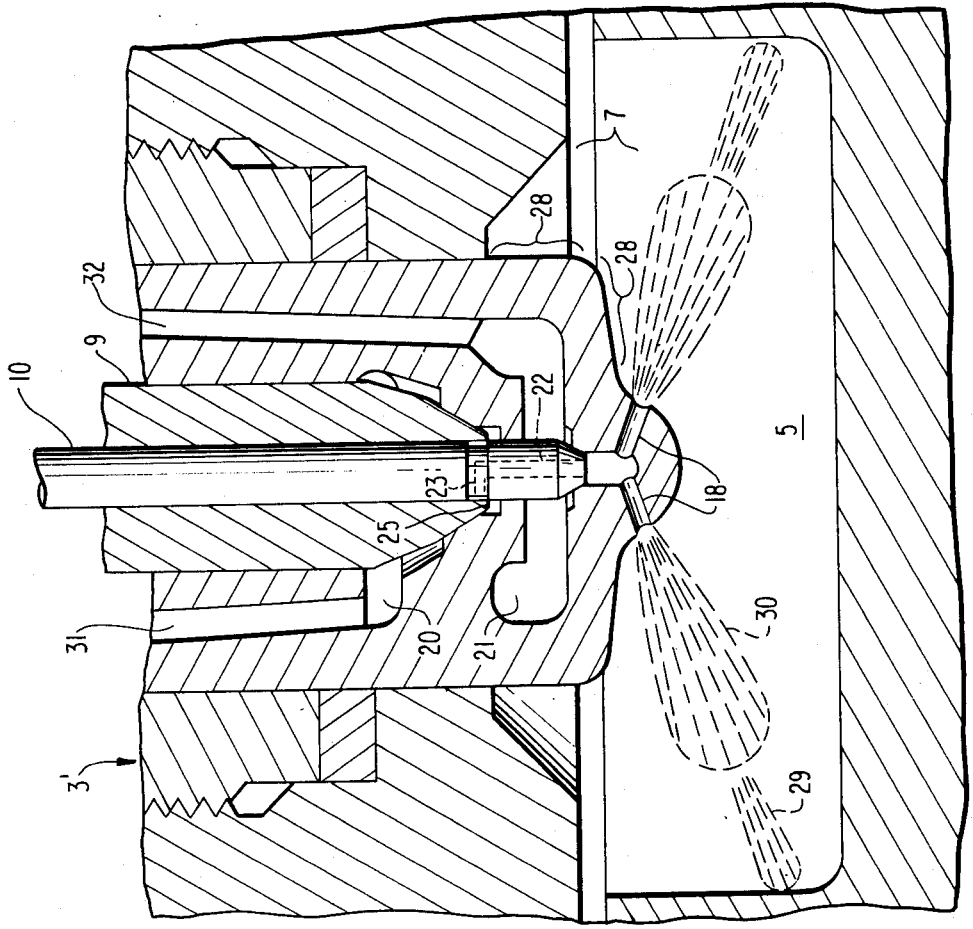
FIG. 5 is a partial cross-sectional view through a further modified embodiment of an injection valve in accordance with the present invention for multi-fuel-mixture operation.

A modified embodiment of the injection valve is illustrated in FIG. 5. In this embodiment, the overflow bores 27 for establishing a direct connection of the two pressure spaces 20 and 21 are missing. In lieu thereof, the preheat chamber 21 is adapted to be supplied with fuel by way of a separate pressure line 32. The modified injection valve 3' illustrated in FIG. 5 is constructed for mixed two-fuel operation. Prerequisite for the use of such an injection valve, however, is the fact that also an injection pump correspondingly constructed for two-fuel operation as well as two separate fuel tanks are provided. Two feed pistons and two stroke cams have to be provided in the injection pump for each working piston of the internal combustion engine; it involves, so to speak of, a double-construction of a normal injection pump. The one feed piston of the injection pump is provided for the one type of fuel and the other feed piston for the other type of fuel. In the injection valve 3' according to FIG. 5, the bore 31 and the pressure chamber 20 are contemplated for that fuel which is to be injected in a pilot jet 29 during the pre-injection. It may thereby involve, for example, normal diesel fuel which has a good self-ignition property with a correspondingly strongly compressed combustion air. A less ignition-friendly fuel, for example, gasoline, can then be injected by way of the bore 32 and the preheat chamber 21, following the pre-injection which initiates an ignition. Apart from the construction of the injection valve according to FIG. 5 for mixed multi-fuel operation, as to the rest, the operation of this valve is the same as that of the injection valve 3 according to FIGS. 2–4.

Figure 6:
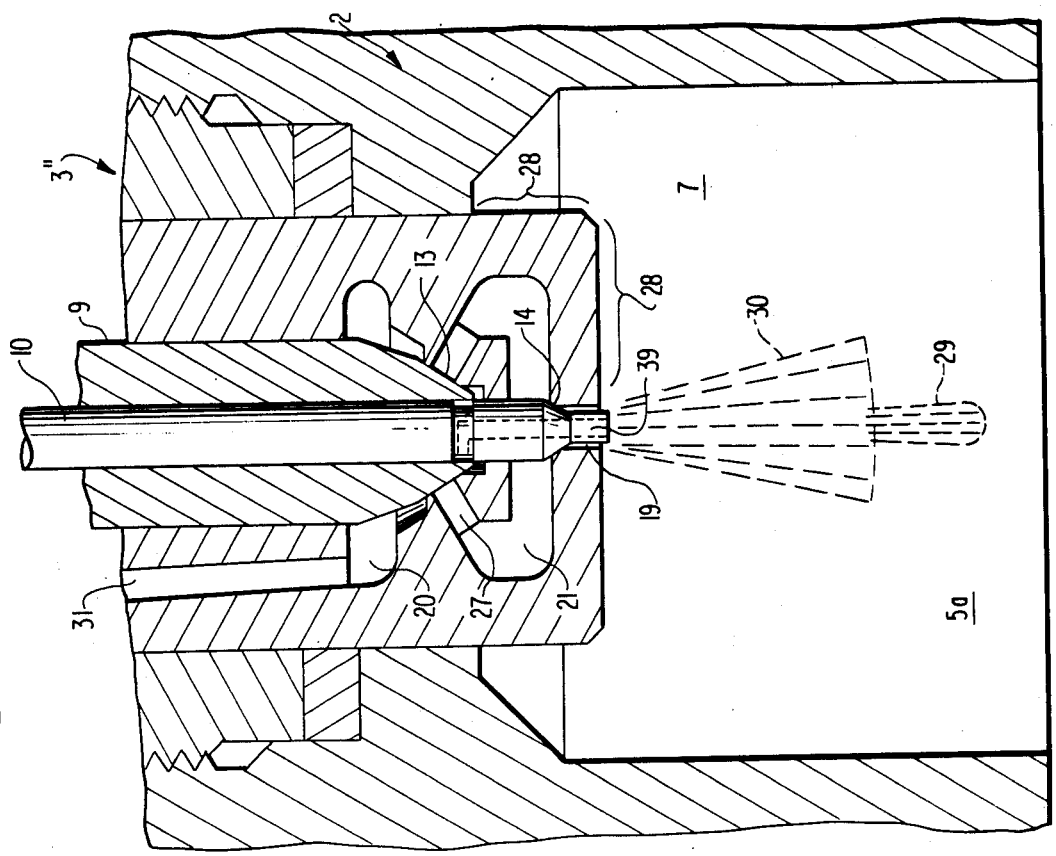
FIG. 6 is a partial cross-sectional view through still a further modified embodiment of an injection valve in accordance with the present invention constructed with a pin nozzle.

The injection valve 3" illustrated in FIG. 6 corresponds far-reachingly to the injection valve according to FIG. 2 designed for single-fuel operation. Differing from the hole-type nozzle valve according to FIG. 2, the injection valve 3" is constructed as pin-type nozzle valve. A single injection or discharge opening 19 is provided adjoining the valve seat 14 of the inner valve needle 10, into which a needle pin 39 extends coaxially. The pilot jet 29 is injected through the interior of the valve needle 10 bored hollow, when the outer valve needle 9 has lifted off from its seat, whereas in contrast thereto, the main injection jet 30 is injected through the annular gap between bore 19 and pin 39, when both valve needles have lifted off from their seat. The pin-type nozzle valve 3" is arranged in a recess 5a inside of the cylinder head 2, which permits an expansion of the injection jets extending coaxially to the valve axis. As to the rest, the arrangement and operation of the injection valve 3" is the same as that of the injection valve 3 of FIG. 2.

Thanks to the delay-free combustion of the preheated main injection quantity as determined by the injection, a soft combustion progress can be achieved with direct injection also without prechamber or vortex chamber. Alone from this direct injection already noticeable fuel economies will result. Therebeyond, however, fuel can be saved also by reason of the better mixture preparation and the more complete combustion as also by reason of the better fuel utilization.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:
1. An injection valve for high pressure injection of a liquid fuel having a flow direction into a working space of an internal combustion engine comprising:
   at least two valve needle means concentrically nested within one another;
   at least two spring means each adapted to press said valve needle means adjacent an associated valve seat means;

at least two valve seat means each associated with a respective valve needle means;

at least two hydraulically, in-series connected pressure space means, each of said pressure space means being located upstream of an associated valve seat means;

wherein each of said valve needle means further comprises:

a valve needle piston means constructed larger in diameter than an associated valve seat means and a pressure space means in operative connection with an effective side of said valve needle piston means, with said valve needle means being pressed against an associated valve seat means by the force of an associated spring means in a closing direction and being operable to be lifted off from said associated valve seat means;

whereby a downstream pressure space means, dimensioned approximately the same size as the largest fuel quantity to be injected by said injection valve per working cycle, is operable to be closed off hydraulically by the valve needle means and is arranged exposed in heat-absorbing relationship to the working space of the internal combustion engine.

2. The injection valve according to claim 1, characterized in that means are provided for a main portion of said liquid fuel being heated up to a temperature of about 300° C. to about 480° C.

3. The injection valve according to claim 1, characterized in that means for imparting a defined turbulence to a combustion air of said working space is provided.

4. An injection valve according to claim 1, characterized in that an outer end of an inner valve needle means which sealingly and slidingly extends through an outer valve needle means is provided with a bore in communication with a cross bore which is valved by a control edge of the outer valve needle means and is operable to be opened during an outer valve needle stroke.

5. The injection valve according to claim 4, characterized in that means for injecting the fuel directly into the working space is provided.

6. The injection valve according to claim 5, characterized in that means are provided for a main portion of said liquid fuel being heated up to a temperature of about 300° C. to about 480° C.

7. An injection valve according to claim 4, characterized in that the pressure space means are annularly shaped and are, during at least a portion of said working cycle, both common to at least one apertured nozzle.

8. An injection valve according to claim 7, characterized in that a volume of said downstream pressure space means is approximately dimensioned the same size as about 80% to about 90% of the maximum fuel quantity to be injected by way of the injection valve per working cycle.

9. An injection valve according to claims 7 or 8, characterized in that during at least a portion of said working cycle the pressure space means are operable to be connected by way of at least one bore.

10. An injection valve according to claim 9, characterized in that said bore starts inside of a valve seat of the outer valve needle means.

11. An injection valve according to claim 9, characterized in that the injection valve is arranged in the internal combustion engine so as to inject directly into the working space thereof.

12. An injection valve according to claim 11, characterized in that a relative maximum stroke of the outer valve needle means is limited with respect to the inner valve needle means by a limit means.

13. An injection valve according to claim 12, characterized in that said limit means are abutments.

14. An injection valve according to claim 12, characterized in that an opening pressure for the inner valve needle means is selected higher than an opening pressure for the outer valve needle means.

15. An injection valve according to claim 1, characterized in that the pressure space means are annularly shaped and are, during at least a portion of said working cycle, both common to at least one apertured nozzle.

16. An injection valve according to claim 1, characterized in that a volume of the downstream pressure space means is approximately dimensioned as large as about 80% to about 90% of the maximum fuel quantity to be injected by way of the injection valve per working cycle.

17. An injection valve according to claim 1, characterized in that during at least a portion of said working cycle the pressure space means are operable to be connected by way of at least one bore.

18. An injection valve according to claim 17, characterized in that said bore starts inside of a valve seat of an outer valve needle means.

19. An injection valve according to claim 1, characterized in that the injection valve is arranged in the internal combustion engine so as to inject directly into the working space thereof.

20. An injection valve according to claim 1, characterized in that a relative maximum stroke of an outer valve needle means is limited with respect to an inner valve needle means by a limit means.

21. An injection valve according to claims 1 or 20, characterized in that an opening pressure for an inner valve needle means is selected higher than an opening pressure for an outer valve needle means.

* * * * *